US008422636B2

(12) United States Patent  
Greenberg et al.

(10) Patent No.: US 8,422,636 B2
(45) Date of Patent: Apr. 16, 2013

(54) PHOTON COUNTING AND ENERGY DISCRIMINATING DETECTOR THRESHOLD CALIBRATION

(75) Inventors: Lev Greenberg, Haifa (IL); Daniel Rubin, Haifa (IL); Baruch Rosner, Haifa (IL); Galit Naveh, Haifa (IL); Reuven Levinson, Haifa (IL); Jerome Stephen Arenson, Haifa (IL); Shalom Rosenberg, Haifa (IL)

(73) Assignee: GE Medical Systems Israel, Ltd., Tirat Carmel (IL)

( * ) Notice: Subject to any disclaimer, the term of this patent is extended or adjusted under 35 U.S.C. 154(b) by 387 days.

(21) Appl. No.: 12/902,291

(22) Filed: Oct. 12, 2010

(65) Prior Publication Data

US 2012/0087463 A1   Apr. 12, 2012

(51) Int. Cl.
*H05G 1/64* (2006.01)
*G01N 23/087* (2006.01)

(52) U.S. Cl.
USPC ........................... 378/98.9; 378/5; 378/207

(58) Field of Classification Search ............ 378/5, 98.9, 378/207
See application file for complete search history.

(56) References Cited

U.S. PATENT DOCUMENTS

| 7,983,397 | B2* | 7/2011 | Michel et al. | 378/165 |
| 8,000,434 | B2* | 8/2011 | Ziegler et al. | 378/5 |
| 8,155,422 | B2* | 4/2012 | Ziegler et al. | 382/132 |
| 2006/0109949 | A1* | 5/2006 | Tkaczyk et al. | 378/4 |
| 2008/0137803 | A1 | 6/2008 | Wu et al. | |
| 2009/0268862 | A1* | 10/2009 | Ziegler | 378/5 |
| 2010/0061504 | A1* | 3/2010 | Proksa | 378/5 |
| 2012/0087463 | A1* | 4/2012 | Greenberg et al. | 378/5 |

FOREIGN PATENT DOCUMENTS

WO   2007110796 A2   10/2007

OTHER PUBLICATIONS

Search Report and Written Opinion from corresponding PCT Application No. PCT/IL2011/000810 dated Jun. 19, 2012.
Ewald, Roessl et al., "Optimal energy threshold arrangement in photon-counting spectra x-ray imaging", pp. 1950-1954, Oct. 1, 2006.
Wang et al, "Optimal energy thresholds and weights for separating materials using photon counting x-ray detectors with energy discriminating capabilities", Progress in Biomedical Optics and Imaging—Proceedings of SPIE—Medical Imaging, vol. 7258, 2009.

(Continued)

*Primary Examiner* — Thomas R Artman
(74) *Attorney, Agent, or Firm* — Ziolkowski Patent Solutions Group, SC (57) ABSTRACT

An imaging system includes an x-ray source, a detector that receives x-rays emitted from the x-ray source, a DAS configured to count photon hits in the detector that occur at photon energies above at least a low keV threshold, a medium keV threshold, and a high keV threshold, and a computer operably coupled to the DAS. The computer is programmed to vary each of the medium keV threshold and the high keV threshold over a continuous keV range during data acquisition to define low, medium, and high keV bins that are based on the low, medium, and high keV thresholds, obtain photon counts in the low, medium, and high keV bins in a plurality of keV threshold combinations, calculate a noise variance as a function of at least one of the keV thresholds, and identify a noise minimum and low, medium, and high keV thresholds that correspond thereto.

20 Claims, 7 Drawing Sheets

OTHER PUBLICATIONS

Roess et al., "Cramer-Rao lower bound of basis image noise in multiple-energy x-ray imaging," Physics in Medicine and Biology, vol. 54, 2009, pp. 1307-1318.

Schlomka et al., "Experimental feasibility of multi-energy photon-counting K-edge imaging in pre-clinical computed tomography," Physics in Medicine and Biology, vol. 53, 2008, pp. 4031-4047.

Greenberg et al., "Energy bin optimization for K-edge imaging in photon-counting spectral CT," IEEE, 2010, pp. 1-2.

Greenberg et al., "Energy Bin Optimization for K-Edge Imaging in Photon-Counting Spectral CT," Abstract, IEEE, 2010, p. 1.

* cited by examiner

PHOTON COUNTING AND ENERGY DISCRIMINATING DETECTOR THRESHOLD CALIBRATION

BACKGROUND

Embodiments of the invention relate generally to an apparatus and method for detector threshold calibration.

Diagnostics devices typically comprise x-ray systems, magnetic resonance (MR) systems, ultrasound systems, computed tomography (CT) systems, positron emission tomography (PET) systems, and other types of imaging systems. Typically, in CT imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry opening within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator. However, a scintillator/photodiode typically does not provide an energy discrimination (ED) capability, or an ability to distinguish energy level of photons.

As such, recent advances in CT imaging systems include an energy discriminating CT imaging system that may be referred to as an EDCT imaging system. Energy sensitive detectors are used such that each x-ray photon reaching the detector is recorded with its photon energy.

The direct conversion semiconductor detectors allow acquisition of multiple energy bins simultaneously from single acquisition with a single x-ray tube spectrum. EDCT provides energy discrimination and material characterization. For example the system derives the behavior at any other energy based on the signal from two regions of photon energy in the spectrum: the low-energy and the high-energy portions of the incident x-ray spectrum. In an energy region of medical CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the relative composition of an object composed of two materials.

A conventional basis material decomposition (BMD) algorithm is based on the concept that in the energy region for medical CT, x-ray attenuation of a material can be represented by a proper density mix of two other materials, referred to as the basis materials. Based on the projections acquired at the two incident x-ray spectra, the BMD algorithm computes two sets of new projections, corresponding to two new CT images that each represents the equivalent density of one of the basis materials. Since BMD contains information regarding density mix of the two basis materials, these images are approximately free of beam-hardening artifacts. An operator can choose the basis material to target a certain material of interest, for example, to get virtually unenhanced image (VUE).

Developments in biotechnology show promise for contrast agents that target specific organs and/or diseases. These contrast agents can be designed to have high-Z elements with a K-edge above 50 keV.

A K-edge indicates a sudden increase in the attenuation coefficient of photons occurring at a photon energy just above the binding energy of the K shell electron of the atoms interacting with the photons. The sudden increase in attenuation is due to photoelectric absorption of the photons. For this interaction to occur, the photons have more energy than the binding energy of the K shell electrons. A photon having an energy just above the binding energy of the electron is therefore more likely to be absorbed than a photon having an energy just below this binding energy. A general term for the phenomenon is absorption edge.

Systems with K-edge contrast materials and/or agents do not fit into the conventional BMD model. The conventional BMD is directed to non K-edge materials. In addition, the conventional BMD cannot account for the K-edge effect of high Z or high atomic number materials such as iodine (I), barium (Ba), tungsten (W), gadolinium (Gd), and xenon (Xe) if the K-edge of the material lies in the active energy region of the incident x-ray spectrum. A design for resolving K-edge contrast agents has employed monochromatic x-ray beams with which the K-edge material can be resolved by imaging the object at photon energies slightly below and slightly above the K-edge, but prevents integration of monochromatic sources with sufficient x-ray flux into a rotating gantry and so limits the application from use as a practical monochromatic x-ray source in medical CT scanners. An exemplary K-edge material comprises a K-edge within an x-ray spectrum employed for a given, selected, and/or particular application. An exemplary non K-edge material may comprise no K-edge, or may comprise a K-edge that is outside the x-ray spectrum for such an application. For example, iodine comprises a K-edge at approximately 33.2 keV. Iodine does comprise a K-edge material in an exemplary low kVp system where the x-ray spectrum covers approximately 20 keV to approximately 50 keV. In another example, iodine would not be considered a K-edge material in a system where the x-ray spectrum starts from approximately 40 keV.

While conventional CT scanners provide Hounsfield unit images that display accurate maps of body density, but limited tissue and material-specific information, spectral CT performs scans with two or more spectra simultaneously to enable material decomposition and quantification. Two spectra (i.e., dual energy CT), are enough to map natural human body composites. However, as stated, more than two spectra are needed for K-edge detection, which make systems using different x-ray spectra not feasible for K-edge detection. In other words K-edge imaging is feasible only with energy sensitive detectors. Moreover, full material specificity is enabled with K-edge materials because no other human tissue has a sudden increase in attenuation in the relevant energy range, enabling improved material characterization. Potential applications of K-edge imaging may allow tagging and detection of cancer and/or vulnerable plaque.

In one technique, photon-counting enables improved energy discrimination, which can benefit from k-edge imaging. Typically, photon-counting is implemented by setting energy thresholds for various bins. That is, multiple bins may be established that are bounded by energy levels, and a number of photon counts occurring in each bin may be used in an imaging application to generate an image. However, different bin setups result in different image quality, material differentiation, and noise. More particularly, spectral imaging data obtained having bins defined non-optimally can lead to a needlessly high level of noise in the final images.

Therefore, it would be desirable to have a data acquisition system for radiation detectors that can optimize threshold positioning in a photon counting application.

BRIEF DESCRIPTION

According to one aspect of the invention, an imaging system includes an x-ray source that emits a beam of x-rays toward an object to be imaged, a detector that receives x-rays emitted from the x-ray source, a data acquisition system (DAS) operably coupled to the detector, the DAS configured to count photon hits in the detector that occur at photon energies above at least a low keV threshold, a medium keV threshold, and a high keV threshold, and a computer operably coupled to the DAS. The computer is programmed to vary each of the medium keV threshold and the high keV threshold over a continuous keV range during data acquisition to define low, medium, and high keV bins that are based on the low, medium, and high keV thresholds, obtain photon counts in the low, medium, and high keV bins in a plurality of keV threshold combinations. This acquisition procedure may be repeated while each time different attenuator is placed in the beam. The computer is programmed to calculate a noise variance as a function of at least one of the keV thresholds, and identify a noise minimum and low, medium, and high keV thresholds that correspond thereto.

In accordance with another aspect of the invention, a method of calibrating an imaging system includes defining photon-counting bins based on low, medium, and high keV thresholds, obtaining photon counts in low, medium, and high photon-counting bins at a plurality of keV threshold combinations, calculating an image noise variance as a function of the keV threshold combinations, determining an image noise minima of the image noise variance, and determining a combination of low, medium, and high keV thresholds that correspond to the determined image noise minima.

Yet another aspect of the invention includes a computer readable storage medium having stored thereon instructions that, when executed by a processor, cause a computer to set a low keV threshold, define low, medium, and high photon-counting bins based on the low keV threshold and based on a combination of keV ranges of the medium keV threshold and the high keV threshold as the medium keV threshold and the high keV threshold are each varied over a keV range, obtain photon counts in the low, medium, and high photon-counting bins as the medium keV threshold and the high keV threshold are each varied over the keV range, calculate an image noise variance as a function of at least the medium keV threshold and the high keV threshold, and identify an image noise minima and a combination of the medium keV threshold and the high keV threshold where the minima occurs.

These and other advantages and features will be more readily understood from the following detailed description of preferred embodiments of the invention that is provided in connection with the accompanying drawings.

DETAILED DESCRIPTION

Diagnostics devices typically comprise x-ray systems, magnetic resonance (MR) systems, ultrasound systems, computed tomography (CT) systems, positron emission tomography (PET) systems, single-photon-emission computed tomography systems (SPECT), and other types of imaging systems. Applications of x-ray sources comprise imaging, medical, security, industrial inspection applications, and portable radiation detectors. The operating environment described herein includes a 64-slice CT system. However, it will be appreciated by those skilled in the art that an implementation of the embodiments described herein is also applicable for use with single-slice or other multi-slice configurations. More generally, an implementation is employable for detection and conversion of x-rays. However, one skilled in the art will further appreciate that an implementation is employable for the detection and conversion of other high frequency electromagnetic energy, high frequency polychromatic electromagnetic energy, and/or radiographic energy. An implementation is employable with a "third generation" CT scanner and/or other CT systems.

Figure 1:
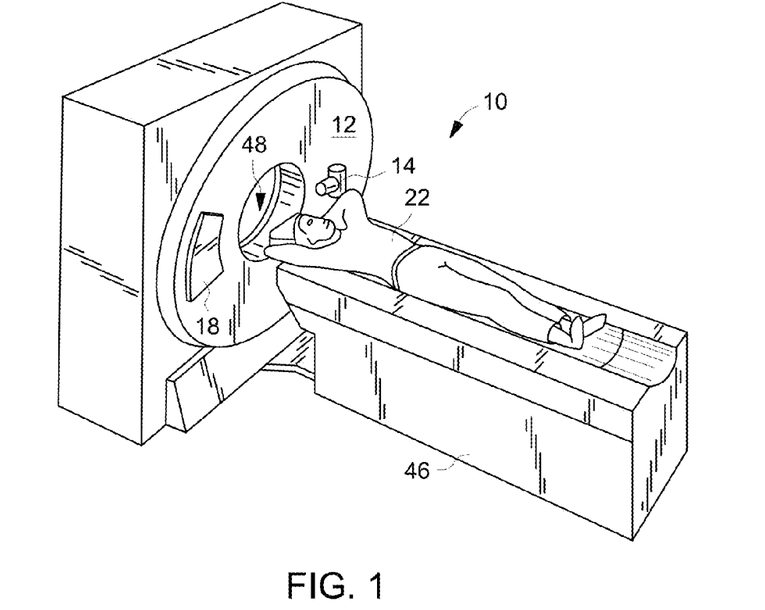
FIG. 1 is a pictorial view of an implementation of a CT imaging system.
Figure 2:
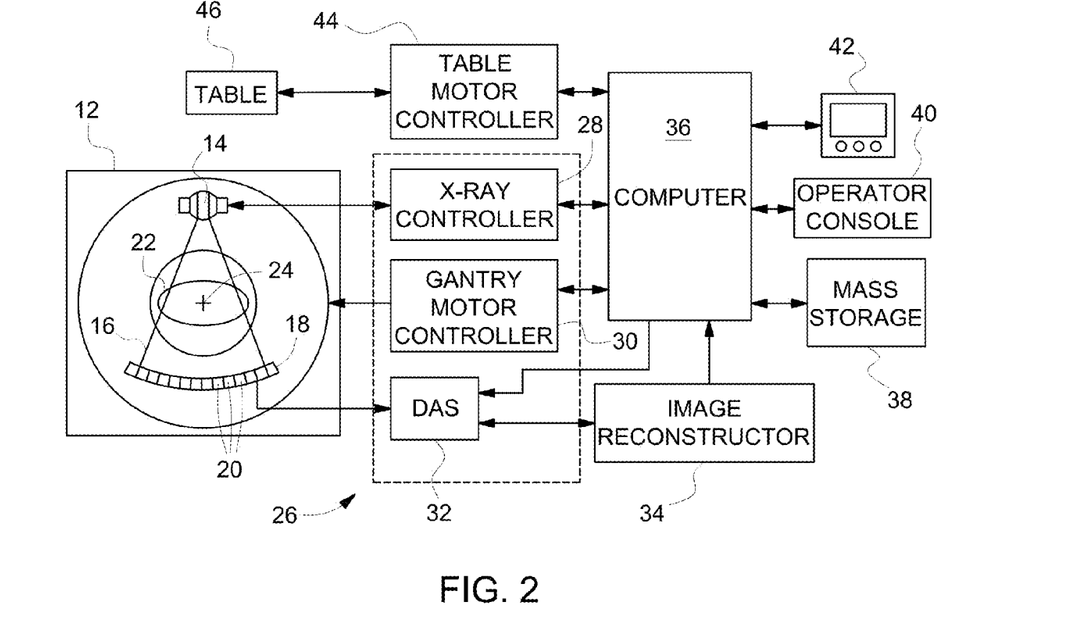
FIG. 2 is a block diagram of the system illustrated in FIG. 1.

Referring to FIGS. 1 and 2, a diagnostic and/or computed tomography (CT) imaging system 10 is shown as including a gantry 12 representative of a "third generation" CT scanner. The CT imaging system 10 in an example comprises an energy discriminating (ED) and/or multi energy (ME) CT imaging system that may be referred to as an EDCT and/or MECT imaging system. Gantry 12 has an x-ray source 14 that projects a beam of x-rays 16 toward a detector array 18 on the opposite side of the gantry 12. Detector array 18 is formed by a plurality of detectors such as ED detectors 20 which together sense the projected x-rays that pass through a patient or object 22. Each ED detector 20 produces an electrical signal that represents the number of photons of an impinging x-ray beam for predefined energy windows and hence the attenuated beam as it passes through the object 22. The ED detector 20 obtains ED readout from the beam of x-rays 16. During a scan to acquire x-ray projection data, gantry 12 and the components mounted thereon rotate about a center of rotation 24, as will be appreciated by those skilled in the art.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from the ED detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position object 22 and gantry 12. Particularly, table 46 moves portions of object 22 through a gantry opening 48.

EDCT provides energy discrimination and material characterization. For example, in the absence of object scatter, the system derives the behavior at any other energy based on the signal from two regions of photon energy in the spectrum: the low-energy and the high-energy portions of the incident x-ray spectrum. In an energy region of CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the relative composition of an object 22 composed of two materials.

K-edge imaging is targeted to obtain full-specificity images of specialized contrast materials from a CT scanner populated with spectral multi-energy bin detectors. As known in the art, K-edge imaging takes advantage of a K-edge 'jump' of the attenuation coefficient. Dual energy kVp switching, or two-tube CT systems enable material decomposition (MD) mainly for separation of light elements, which typically include natural body composites. By adding one or more energy bins in the x-ray energy spectrum, MD can be extended. Thus, obtaining K-edge images is possible if measurements are performed with at least three energy windows. According to embodiments of the invention, a technique includes determining optimal locations on the energy scale of the three thresholds that bound these energy windows to minimize noise in K-edge images.

As stated, K-edge imaging includes obtaining data in energy bins that are defined by three (or more, in embodiments of the invention) energy thresholds, designated in ascending order as VTA, VTB, and VTC. In order to obtain such data, the binned data may be obtained using a three-threshold detector having respective thresholds VTA, VTB, and VTC.

Figure 3:
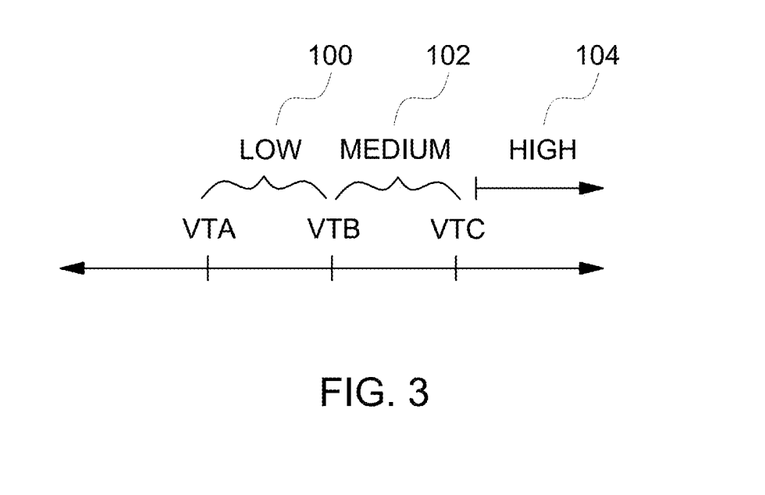
FIG. 3 is an illustration of two and three threshold acquisition of bin data according to embodiments of the invention.

Referring to FIG. 3, a low bin count (LOW 100) may be obtained by calculating the difference between VTA and VTB, a medium bin count (MEDIUM 102) may be obtained by calculating the difference between VTB and VTC, and a high bin count (HIGH 104) may be obtained by simply using VTC.

X-ray photons counted by a CT detection system generally vary from 30 keV to 140 keV. However, it is to be recognized that the invention is not to be so limited, but may be applicable to any range of energies experienced in an imaging system. And, as known in the art, electronics of photon counting detectors may include a pre-amplifier and shaper to convert each incoming photon into a voltage pulse, whose amplitude, measured in mV units, is correlated with the energy of the photon. The voltage pulse may be fed into comparators corresponding to the three thresholds, and a pulse is thereby fed into a serial counter depending on the voltage pulse with respect to a threshold.

Figure 4:
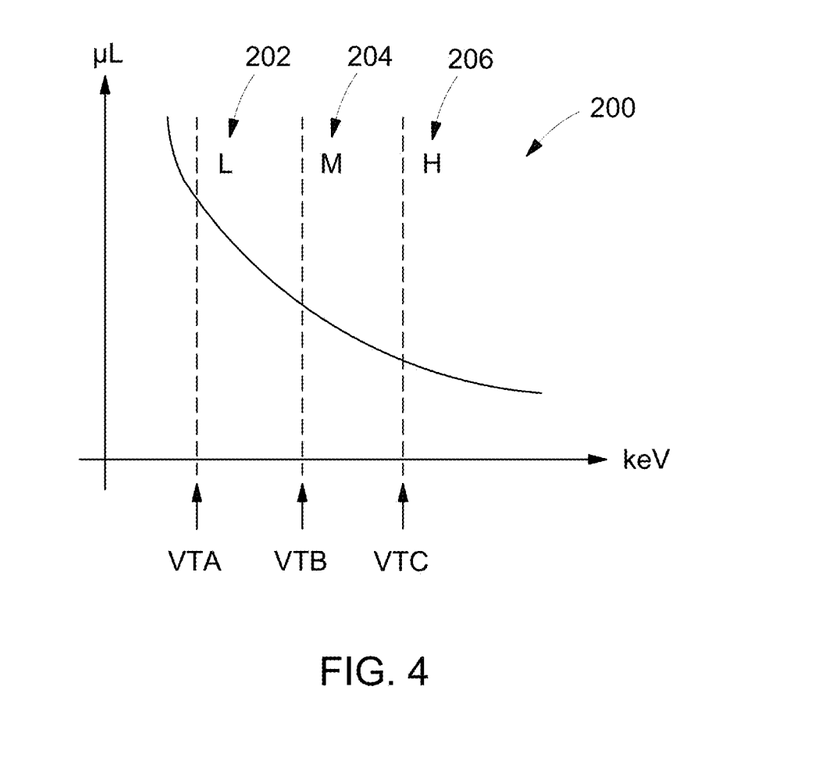
FIG. 4 illustrates a representative x-ray attenuation coefficient as a function of photon energy.

Two modes of operation may be implemented according to embodiments of the invention. In a calibration mode, threshold combinations are varied in order to determine a combination of thresholds (VTA, VTB, VTC) that result in a minimized amount of image noise. Calibration is performed for each specific combination of basis materials. In normal operating mode, values of thresholds are constant during a scan, having been obtained in a prior calibration step. As stated, thresholds are previously obtained specific to basis material combinations which may later be used for imaging in normal mode. The following discussion is directed primarily toward the mode for calibration. However, it is to be understood that, once calibration is performed, then embodiments of the invention include a normal or imaging mode where thresholds are stored and used in an imaging system, the thresholds derived previously and specific to pre-determined sets of basis materials and K-edge materials. In one embodiment, one of the basis materials is selected as one of a water-like, a contrast-like, and a K-edge material Referring to FIG. 4, a representative x-ray attenuation coefficient as a function of photon energy is illustrated 200. For organic materials generally present in the human body, such a function possesses a generally monotonically decreasing form, as illustrated. As such, organic materials can be roughly approximated to a combination of Compton scattering and photoelectric absorption effect functions, as is commonly known in dual energy imaging. Therefore, no matter where the thresholds (L, M, H) are placed, as known in the art, the prep (negative log of the ratio between a material readout and an air readout) for such materials would likewise decrease monotonically from LOW 202, to MEDIUM 204, to HIGH 206 (L, M, H) bins.

Figure 5:
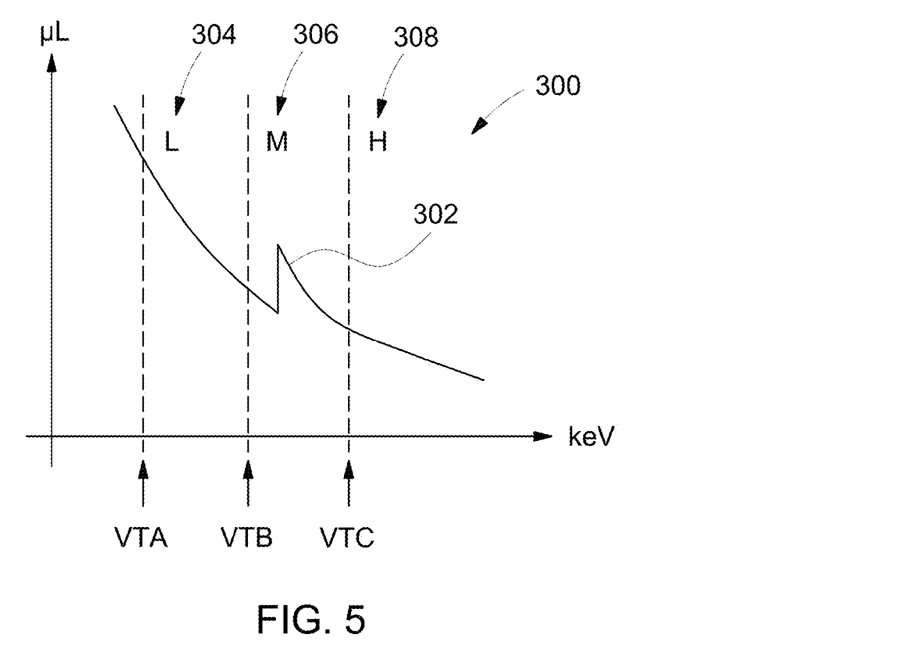
FIG. 5 illustrates threshold settings relative to a material k-edge according to an embodiment of the invention.
Figure 6:
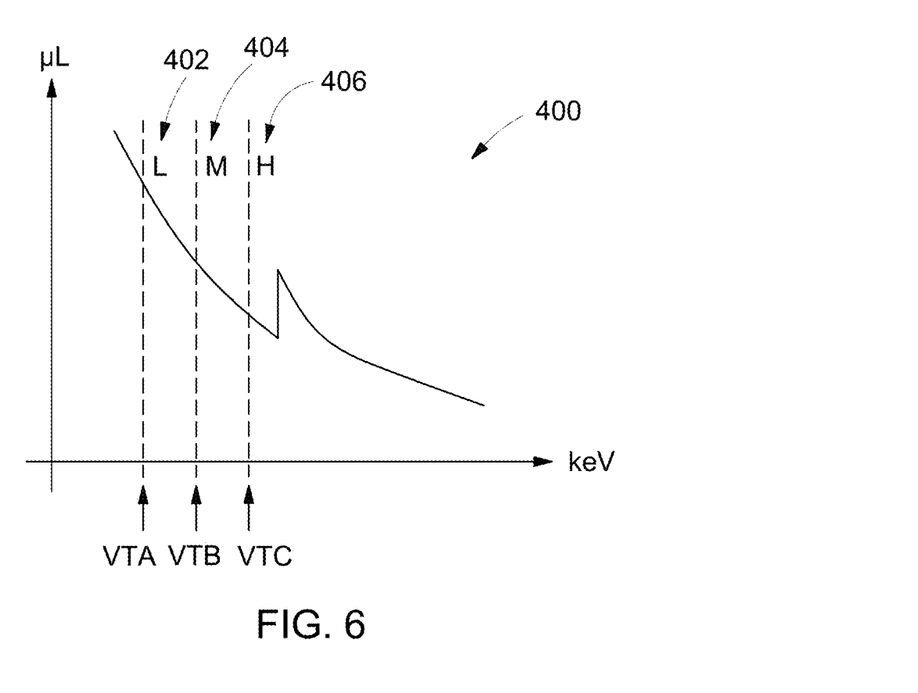
FIG. 6 illustrates threshold settings relative to a material k-edge according to an embodiment of the invention.

Alternatively, as known in the art, K-edge materials such as Gadolinium, Tungsten, and Gold introduce a jump in the attenuation coefficient function as illustrated in FIGS. 5 and 6. Thus, if thresholds are set in a K-edge imaging application, behavior of the prep of such K-edge materials is different from the organic materials, enabling K-edge materials to be distinguished therefrom. Thus, with systems having three or more bins, it is possible to detect specifically elements with K-edge energies between, for instance, 50-90 keV.

Referring to FIG. 5, an attenuation coefficient 300 experiences a sharp increase 302 occurs from LOW 304 to MEDIUM 306, which then decreases from MEDIUM 306 to HIGH 308. Similarly in FIG. 6, an attenuation coefficient 400 exhibits a decrease that occurs from LOW 402 to MEDIUM 404, but an increase then occurs from MEDIUM 404 to HIGH 406. This jump in attenuation coefficient may be exploited in a K-edge imaging application, as known in the art. However, the threshold values that define the LOW, MEDIUM, and HIGH bins may be optimized in order to reduce image noise and improve image quality, according to embodiments of the invention.

As such, embodiments of the invention are directed toward optimally converting measurements obtained in a detector into estimated amounts of two basis materials and one K-edge material. Because each attenuation effect (K-edge, photoelectric, and Compton) linearly influence overall attenuation, a linear dependence is assumed of the measured bin preps on equivalent amounts (surface densities) of the two basis materials and the K-edge material:

$$\begin{pmatrix} P_{LOW} \\ P_{MEDIUM} \\ P_{HIGH} \end{pmatrix} = C \begin{pmatrix} R_{MAT1} \\ R_{MAT2} \\ R_{K\text{-}edge} \end{pmatrix};\qquad \text{EQN. 1,}$$

where $P_{BIN}$ is the prep measured in a specific energy bin, C is a coefficient transformation matrix, and $R_M$ is the surface density of material M, typically measured in units of mg/cm². Matrix C typically defines a response of a detector at a specific threshold configuration, and matrices C corresponding to different pixels can be expected to differ from one another.

Matrix C can be obtained experimentally by separately subjecting a known amount of each material {MAT1, MAT2, and K-edge} to x-ray and measuring the resultant prep. Upon measuring each material, data is obtained to support $P_{BIN}^{MAT} = C_{BIN}^{MAT} R_{MAT}$, where $P_{BIN}$ is the prep measured in a specific bin, $R_{MAT}$ is the known relation:

$$R_{MAT} = \rho_{MAT} L_{MAT};\qquad \text{EQN. 2,}$$

and C is the mass attenuation coefficients matrix:

$$C_{BIN}^{MAT} = \frac{P_{BIN}^{MAT}}{\rho_{MAT} L_{MAT}},$$

with $\rho$ the density and L the optical length of the material. $P_{BIN}^{MAT}$ can be evaluated from measurements:

$$P_{BIN}^{MAT} = -\ln\left(\frac{N_{BIN}^{ref+MAT}}{N_{BIN}^{ref}}\right);\qquad \text{EQN. 3.}$$

Rearranging and expanding:

$$\begin{pmatrix} R_{MAT1} \\ R_{MAT2} \\ R_{K\text{-}edge} \end{pmatrix} = \begin{pmatrix} C_{LOW}^{MAT1} & C_{LOW}^{MAT2} & C_{LOW}^{K\text{-}edge} \\ C_{MEDIUM}^{MAT1} & C_{MEDIUM}^{MAT2} & C_{MEDIUM}^{K\text{-}edge} \\ C_{HIGH}^{MAT1} & C_{HIGH}^{MAT2} & C_{HIGH}^{K\text{-}edge} \end{pmatrix}^{-1} \begin{pmatrix} P_{LOW} \\ P_{HIGH} \\ P_{MEDIUM} \end{pmatrix};\qquad \text{EQN. 4.}$$

The noise of $R_{MAT}$ is generally in direct correlation with noise in any resultant images and is used, according to embodiments of the invention, as an indicator of image quality. $R_{MAT}$ is evaluated as:

$$R_{MAT} = \sum_{BIN=1}^{3} \left((C^{-1})_{MAT}^{BIN} \cdot P_{BIN}\right);\qquad \text{EQN. 5,}$$

thus, assuming the independence between energy bins, the variance is:

$$\text{Var}(R_{MAT}) = \sum_{BIN=1}^{3} \left((C^{-1})_{MAT}^{BIN2} \cdot \text{Var}(P_{BIN})\right);\qquad \text{EQN. 6.}$$

The distribution of detected countrates can be represented as a Poisson distribution function $x_{BIN}=\text{Poisson}(N_{BIN})$, wherein $N_{BIN}$ is the Poisson factor, also equal to an average measured countrate in a specific bin. By applying probability theory equations:

$$\text{Var}(P_{BIN}) \cong \frac{1}{N_{BIN}};\qquad \text{EQN. 7.}$$

Combining EQNS. 6 and 7;

$$\text{Var}(R_{MAT}) = \sum_{BIN=1}^{3} \frac{\left((C^{-1})_{MAT}^{BIN2}\right)}{N_{BIN}};\qquad \text{EQN. 8.}$$

Thus, EQN. 8 enables a proportional assessment of image quality, according to embodiments of the invention.

Figure 7:
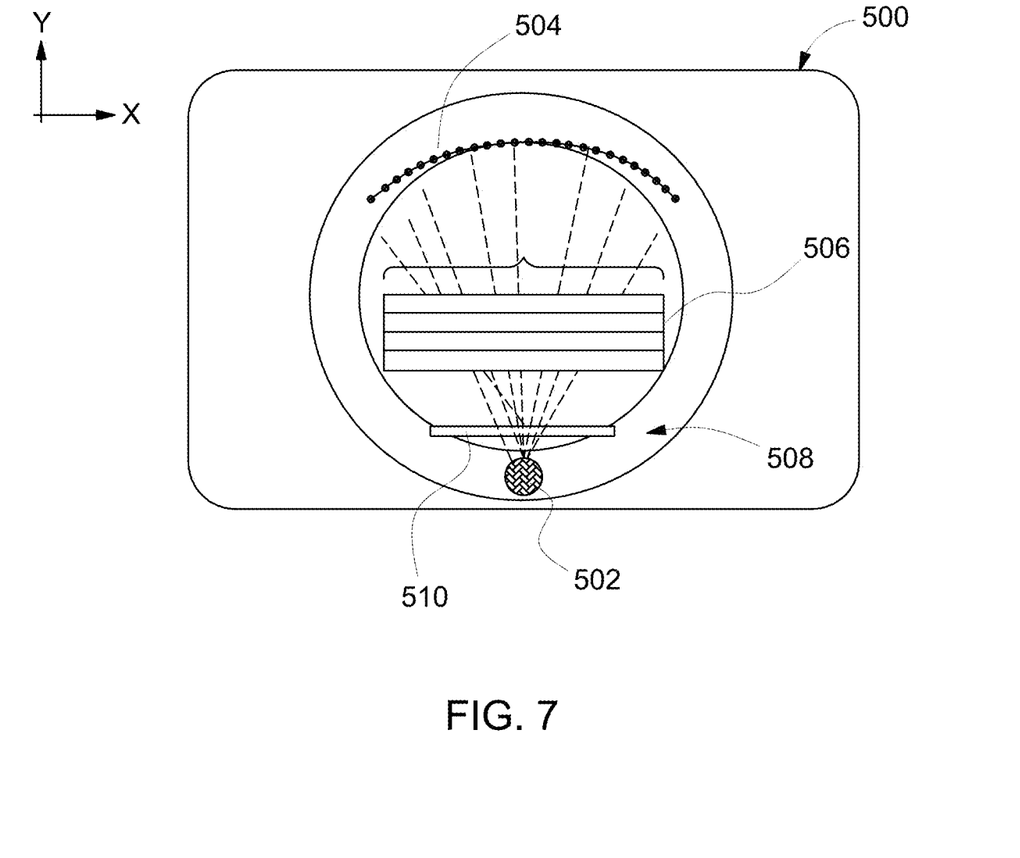
FIG. 7 illustrates a system for calibration or spectral scanning, as well as temporal scanning, according to embodiments of the invention.

Referring now to FIG. 7, system 500 is illustrated for calibration or spectral scanning, as well as normal or diagnostic scanning, according to embodiments of the invention. System 500 is a front view along a patient or Z axis of a CT scanner. System 500 includes an x-ray tube 502 and a detector array 504. A reference absorber 506 such as a water phantom is positioned such that x-rays that pass from x-ray tube 502 to detector array 504 pass therethrough. In an additional position 508, an absorber material 510 may be placed during calibration of system 500, according to embodiments of the invention. During calibration of system 500 and as will be described, position 508 may be left unoccupied, or position 508 may selectively have positioned therein a first basis material, a second basis material, or a K-edge material, according to embodiments of the invention.

Figure 8:
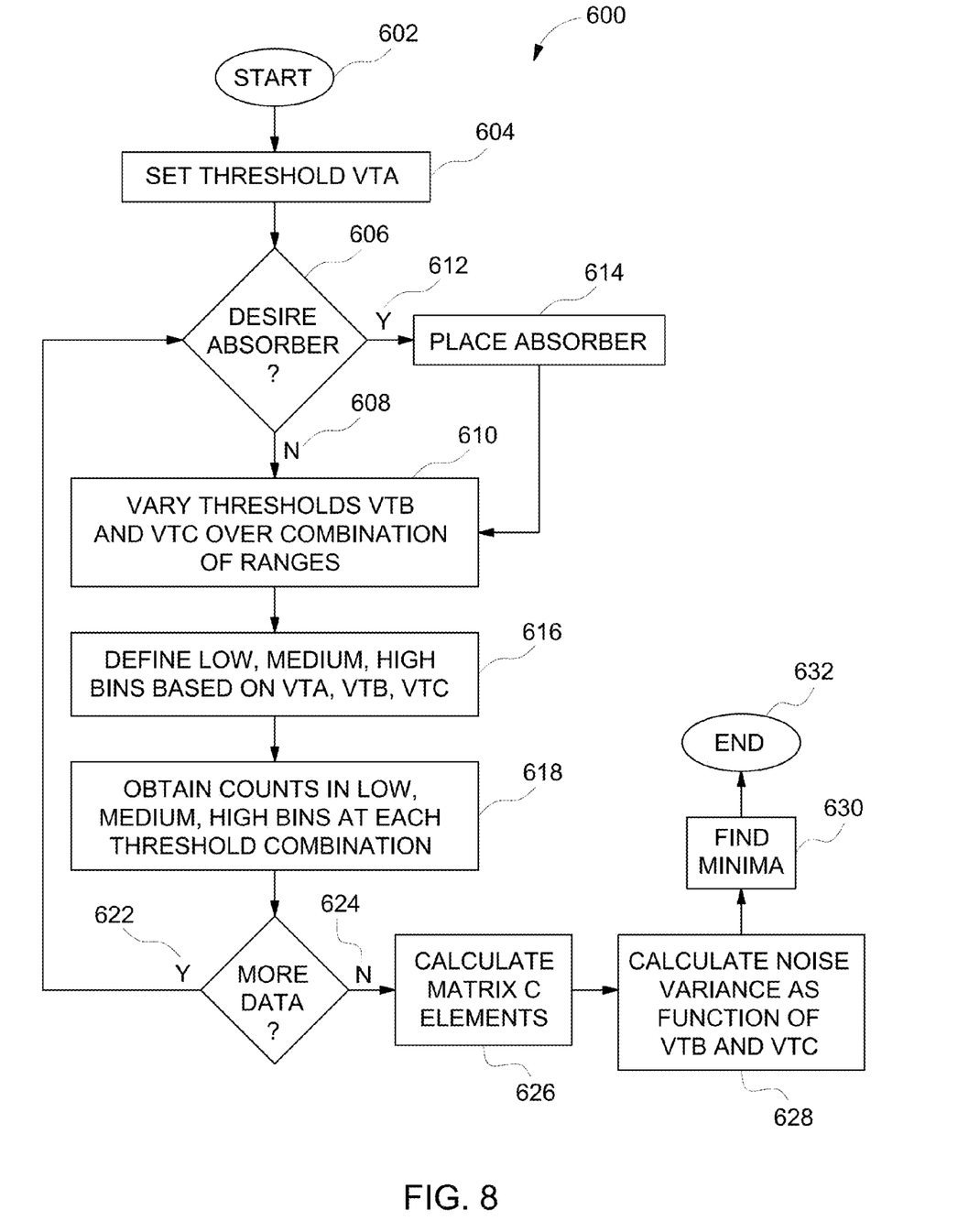
FIG. 8 illustrates a spectral or calibration technique according to the invention.

FIG. 8 illustrates a spectral or calibration technique 600 that may be implemented in system 500. Spectral or calibration technique 600 begins 602 by setting a low keV threshold VTA at step 604. In one embodiment, VTA is set to 35 keV, and in another embodiment VTA is set based on a photon energy level below which little significant image information is contained. In yet another embodiment, VTA may be varied over a keV range in order to find an optimal VTA setting. In other words, on a low end of a spectral distribution, there is typically a threshold below which a photon energy level is not significantly distinguishable, 35 keV in some applications. However, VTA is not to be so limited and may be set to any value below VTB/VTC according to the invention.

Referring to system 500 of FIG. 7, technique 600 continues either by having no material positioned at additional position 508, or by adding and replacing additional absorber materials that include a first basis material, a second basis material, and a K-edge material. Thus, at step 606 it is determined whether to include an absorber material at additional position 508 or not. If not 608, then VTB and VTC are established and at step 610 threshold ranges are varied over a continuous combination thereof. However, if an absorber material is to be included 612, then a material such as a first basis material, a second basis material, or a K-edge material is positioned at additional position 508 at step 614. In one example, VTB and VTC are varied between 35 keV and 120 keV. However, it is to be understood that the ranges of VTB and VTC are not to be so limited, and may be varied over any range over which imaging data may be acquired in a multi-energy acquisition. For instance, in some applications (such as mammography), keV may be below 30 keV, while in other applications (such as CT) keV may be set to 140 keV or above. As such, keV may be set preferably to a range of 35 keV to 140 keV. However, it is to be understood that the range of keV is not to be so limited, and may be set to any range based on a given imaging application.

Low, medium, and high energy bins are established at step 616, based on the VTA, VTB, and VTC thresholds as established in steps 604 and 610 above, and as VTB/VTC are varied over their range. Photon counts are obtained in each of the low, medium, and high energy bins at each threshold combination at step 618. At step 620 it is determined whether all data has been acquired. In other words, if more data is desired 622, to include 1) no absorber at additional position 508, 2) first basis material at additional position 508, 3) second basis material at additional position 508, and 4) K-edge material at additional position 508, then control passes back to step 606. However, if no more data is desired 624, then matrix C elements are calculated at step 626 as discussed. Once matrix C elements have been determined, then EQN. 8 may be applied at step 628 to calculate a noise variance as a function of VTB and VTC.

Figure 9:
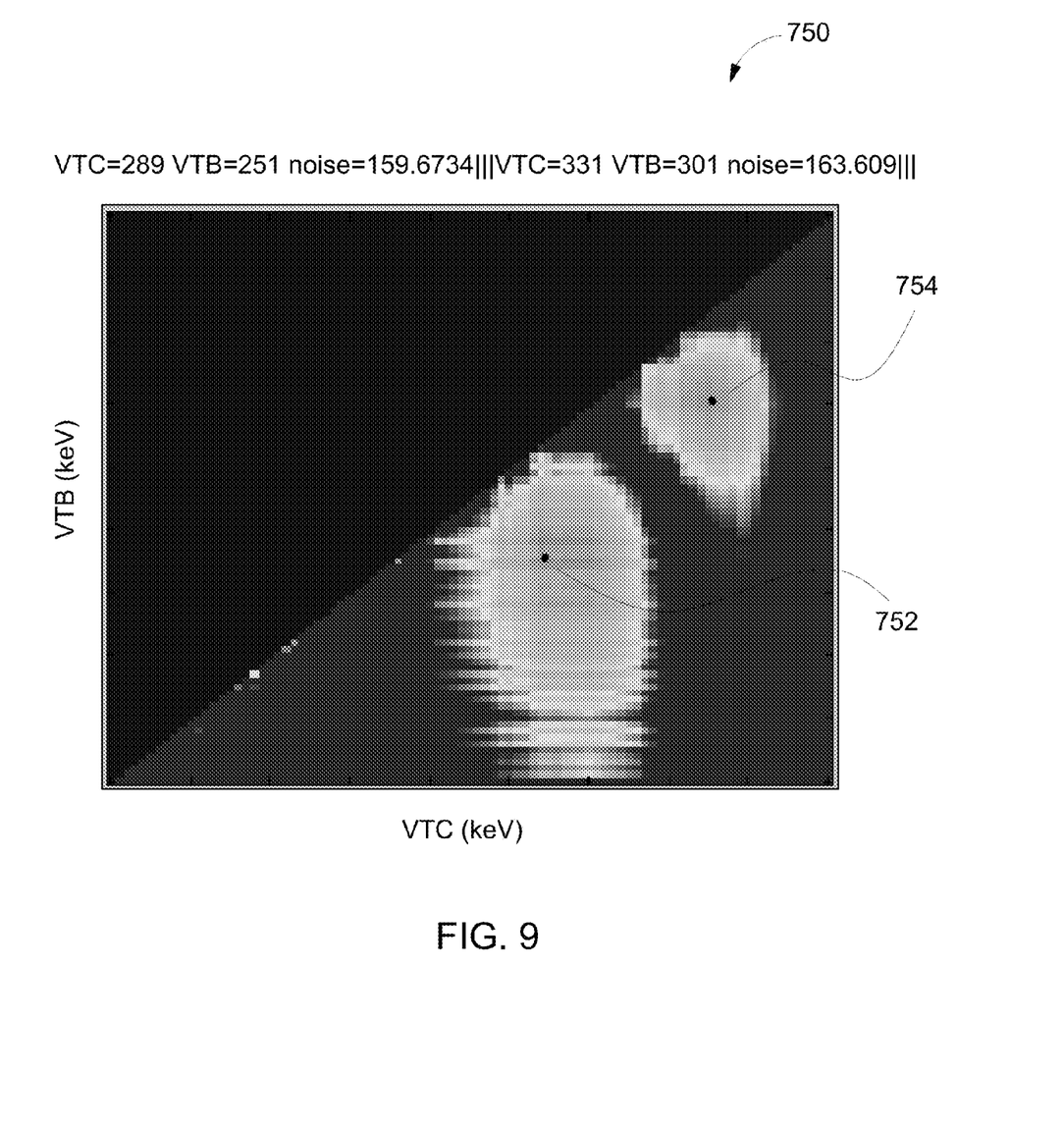
FIG. 9 is a graphical illustration of noise variance according to the invention.

Noise variance may be illustrated graphically 750 as shown in FIG. 9. As illustrated, noise can be characterized by two cavities or baths around two local minima, corresponding to lower and higher energy baths that originate from the K-edge material. In conjunction with FIGS. 5 and 6, a lower bath 752 corresponds to a locus of combinations where all thresholds VTA, VTB, and VTC, are found under the K-edge (FIG. 6), whereas a higher bath 754 corresponds to a VTC threshold that is found above the K-edge (FIG. 5). Thus, referring back to technique 600 of FIG. 8, local minima may be numerically or graphically determined at step 630. The local minima 752, 754 of FIG. 9 represent corresponding thresholds VTB and VTC that may be selected having minimal noise in a final image derived therefrom. The process ends at step 632.

Although technique 600 is illustrated having threshold VTA fixed and thresholds VTB and VTC variable, it is to be understood that technique 600 is generally applicable to any combination of thresholds and not just three. Thus, although one threshold (VTA) is fixed and the other two (VTB, VTC) are variable, it is contemplated that all three thresholds (VTA, VTB, VTC) can be variable, or that any one of the thresholds can be fixed (and not only VTA).

Thus, an imaging system may be calibrated to include any combination of two basis materials and a K-edge material. Once such calibration information is obtained for one or many material combinations, the calibration information may be stored for later access during a temporal K-edge imaging session.

Figure 10:
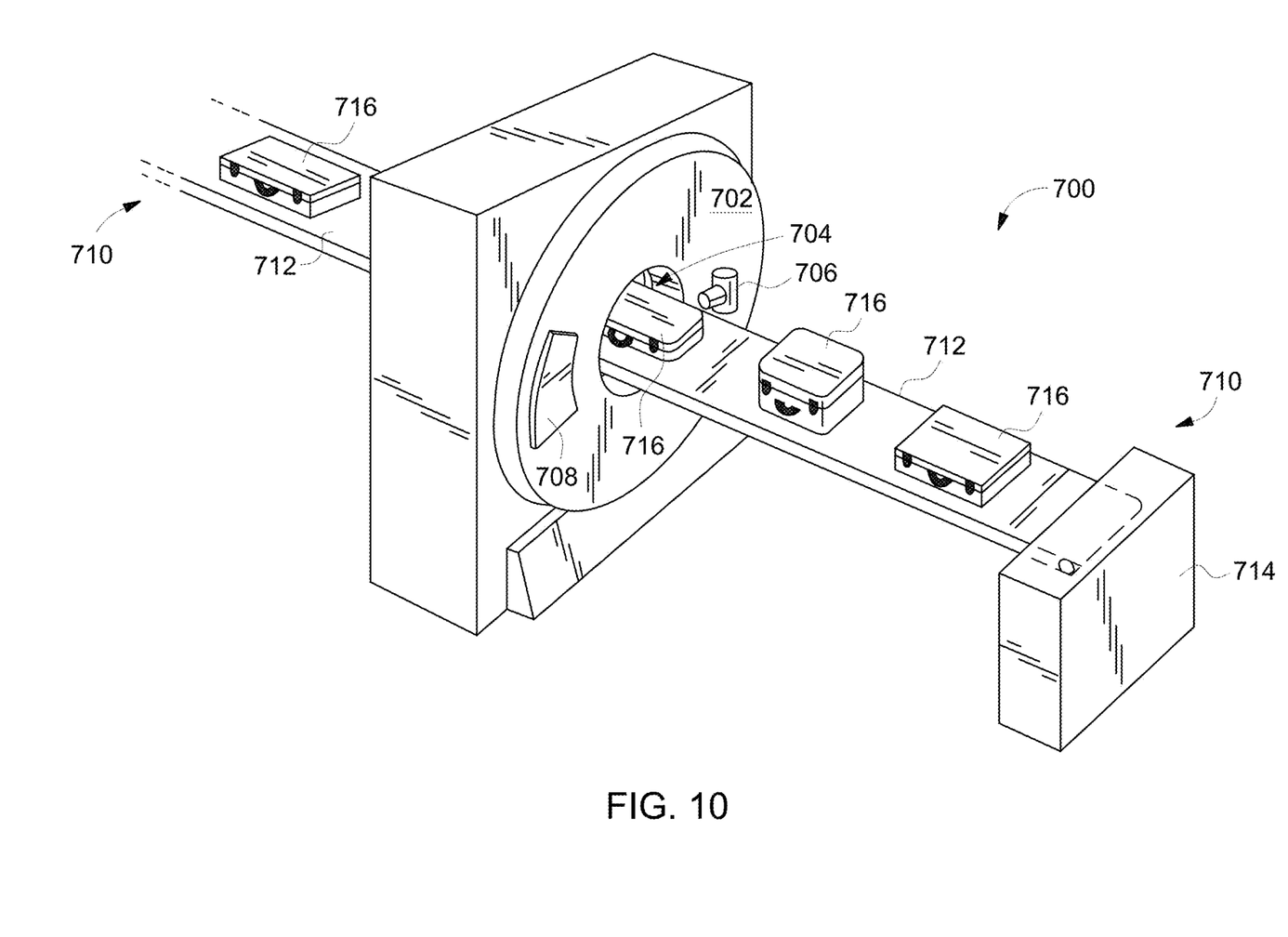
FIG. 10 is a pictorial view of a CT system for use with a non-invasive package inspection system.

Referring now to FIG. 10, package/baggage inspection system 700, incorporating embodiments of the invention, includes a rotatable gantry 702 having an opening 704 therein through which packages or pieces of baggage may pass. The rotatable gantry 702 houses a high-frequency electromagnetic energy source 706 as well as a detector assembly 708 semiconductor radiation detector elements. A conveyor system 710 is also provided and includes a conveyor belt 712 supported by structure 714 to automatically and continuously pass packages or baggage pieces 716 through opening 704 to be scanned. Objects 716 are fed through opening 704 by conveyor belt 712, imaging data is then acquired, and the conveyor belt 712 removes the packages 716 from opening 704 in a controlled and continuous manner. As a result, postal inspectors, baggage handlers, and other security personnel may non-invasively inspect the contents of packages 716 for explosives, knives, guns, contraband, etc.

A technical contribution for the disclosed method and apparatus is that is provides for a computer implemented method for detector threshold calibration.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, an imaging system includes an x-ray source that emits a beam of x-rays toward an object to be imaged, a detector that receives x-rays emitted from the x-ray source, a data acquisition system (DAS) operably coupled to the detector, the DAS configured to count photon hits in the detector that occur at photon energies above at least a low keV threshold, a medium keV threshold, and a high keV threshold, and a computer operably coupled to the DAS. The computer is programmed to vary each of the medium keV threshold and the high keV threshold over a continuous keV range during data acquisition to define low, medium, and high keV bins that are based on the low, medium, and high keV thresholds, obtain photon counts in the low, medium, and high keV bins in a plurality of keV threshold combinations, calculate a noise variance as a function of at least one of the keV thresholds, and identify a noise minimum and low, medium, and high keV thresholds that correspond thereto.

In accordance with another embodiment of the invention, a method of calibrating an imaging system includes defining photon-counting bins based on low, medium, and high keV thresholds, obtaining photon counts in low, medium, and high photon-counting bins at a plurality of keV threshold combinations, calculating an image noise variance as a function of the keV threshold combinations, determining an image noise minima of the image noise variance, and determining a combination of low, medium, and high keV thresholds that correspond to the determined image noise minima.

Yet another embodiment of the invention includes a computer readable storage medium having stored thereon instructions that, when executed by a processor, cause a computer to set a low keV threshold, define low, medium, and high photon-counting bins based on the low keV threshold and based on a combination of keV ranges of the medium keV threshold and the high keV threshold as the medium keV threshold and the high keV threshold are each varied over a keV range, obtain photon counts in the low, medium, and high photon-counting bins as the medium keV threshold and the high keV threshold are each varied over the keV range, calculate an image noise variance as a function of at least the medium keV threshold and the high keV threshold, and identify an image noise minima and a combination of the medium keV threshold and the high keV threshold where the minima occurs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An imaging system comprising:
   an x-ray source that emits a beam of x-rays toward an object to be imaged;
   a detector that receives x-rays emitted from the x-ray source;
   a data acquisition system (DAS) operably coupled to the detector, the DAS configured to count photon hits in the detector that occur at photon energies above at least a low keV threshold, a medium keV threshold, and a high keV threshold; and
   a computer operably coupled to the DAS and programmed to:
   vary each of the medium keV threshold and the high keV threshold over a continuous keV range during data acquisition to define low, medium, and high keV bins that are based on the low, medium, and high keV thresholds;
   obtain photon counts in the low, medium, and high keV bins in a plurality of keV threshold combinations;
   calculate a noise variance as a function of at least one of the keV thresholds; and
   identify a noise minimum and low, medium, and high keV thresholds that correspond thereto.

2. The imaging system of claim 1 wherein the low keV threshold is based on a photon energy level below which little significant image information is contained.

3. The imaging system of claim 1 wherein the low keV threshold is approximately 35 keV.

4. The imaging system of claim 1 wherein the object is a calibration water phantom.

5. The imaging system of claim 4 wherein the object includes a basis material.

6. The imaging system of claim 5 wherein the basis material is one of a water-like material, a contrast-like material, and a K-edge material.

7. The imaging system of claim 1 wherein the computer is programmed to calculate a mean count for each of the low, medium, and high keV bins, and for each of three basis materials, and calculate the noise variance based thereon.

8. A method of calibrating an imaging system comprising:
   defining photon-counting bins based on low, medium, and high keV thresholds;
   obtaining photon counts in low, medium, and high photon-counting bins at a plurality of keV threshold combinations;
   calculating an image noise variance as a function of the keV threshold combinations;
   determining an image noise minima of the image noise variance; and
   determining a combination of low, medium, and high keV thresholds that correspond to the determined image noise minima.

9. The method of claim 8 wherein obtaining the photon counts in the low, medium, and high photon-counting bins comprises obtaining the photon counts having at least a water phantom positioned between an x-ray source and a detector that is positioned to obtain the photon counts.

10. The method of claim 9 wherein the water phantom includes a k-edge material.

11. The method of claim 10 wherein the k-edge material includes one of a water-like material, a contrast-like material, and a K-edge material.

12. The method of claim 11 wherein obtaining photon counts in the low, medium, and high photon-counting bins comprises obtaining the photon counts over an acquisition session that includes passing x-rays through the water phantom and another of the water-like material, a contrast-like material, and a K-edge material.

13. The method of claim 8 comprising defining the low keV threshold based on a photon energy level below which little significant image information is contained.

14. The method of claim 8 comprising defining the low keV threshold as 35 keV.

15. A computer readable storage medium having stored thereon instructions that, when executed by a processor, cause a computer to:
    set a low, medium, and high keV threshold;
    define low, medium, and high photon-counting bins based on the low keV threshold and based on a combination of keV ranges of the medium keV threshold and the high keV threshold as the medium keV threshold and the high keV threshold are each varied over a keV range;
    obtain photon counts in the low, medium, and high photon-counting bins as the medium keV threshold and the high keV threshold are each varied over the keV range;
    calculate an image noise variance as a function of at least the medium keV threshold and the high keV threshold; and
    identify an image noise minima and a combination of the medium keV threshold and the high keV threshold where the minima occurs.

16. The computer readable storage medium of claim 15 wherein the computer is further caused to set the low keV threshold based on a photon energy level below which little significant image information is contained.

17. The computer readable storage medium of claim 15 wherein the computer is further caused to obtain the photon counts after passing x-rays through a water phantom.

18. The computer readable storage medium of claim 17 wherein the water phantom includes one of a water-like material, a contrast-like material, and a K-edge material.

19. The computer readable storage medium of claim 15 wherein the computer is further caused to calculate a mean photon count for each of the low, medium, and high keV bins, and for each of three basis materials obtained in separate acquisitions, and calculate the image noise variance based thereon.

20. The computer readable storage medium of claim 15 wherein the keV range varies from approximately 35 keV to 140 keV.

* * * * *